US005143175A

United States Patent [19]

Tomko

[11] Patent Number: 5,143,175

[45] Date of Patent: Sep. 1, 1992

[54] CUTTING APPARATUS

[76] Inventor: Robert B. Tomko, R.D. 3, Box 117, Columbia Cross Roads, Pa. 16914

[21] Appl. No.: 791,341

[22] Filed: Nov. 14, 1991

[51] Int. Cl.[5] ........................ B23Q 3/00; B27B 21/00; B25H 1/06

[52] U.S. Cl. .................................... 182/181; 182/224; 269/902

[58] Field of Search ................................ 182/181-186, 182/224, 225; 269/902

[56] References Cited

U.S. PATENT DOCUMENTS

| | | | |
|---|---|---|---|
| 2,989,142 | 6/1961 | Gill | 182/224 |
| 4,454,929 | 6/1984 | Wellman | 182/181 |
| 4,566,559 | 1/1986 | Asten | 269/902 |
| 4,609,070 | 9/1986 | Porps | 269/902 |
| 4,718,652 | 1/1988 | Liebenstein | 269/902 |
| 5,092,571 | 3/1992 | Stevens | 269/902 |

*Primary Examiner*—Reinaldo P. Machado
*Attorney, Agent, or Firm*—Richard G. Stephens

[57] ABSTRACT

A sawbuck comprising a first pair of members which support one end of a log at a given elevation, with means to support another portion of the log at a lesser elevation, and means to chain down a portion of a log.

7 Claims, 1 Drawing Sheet

CUTTING APPARATUS

My invention relates to accessory apparatus for cutting logs and brush.

On many farms and woodlands it is either necessary or highly desirable to cut logs and brush into lengths usable for firewood. In recent years almost all such cutting has been done using chain saws. A primary object of the present invention is to provide an improved accessory, or sawbuck, which is useful for cutting logs and brush using a chain saw. It long has been recognized as advantageous to support logs above the ground in order to avoid chain damage which may result from rocks on the ground, and hence a variety of sawbucks which will support a log above the ground are known in the prior art.

A number of known sawbucks are undesirable because they require the operator to lift very heavy logs before such devices become useful. One object of the present invention is to provide a sawbuck device in which less lifting effort is required by the user, so that a single person can process heavier logs.

Various known types of sawbucks are undesirable because they are useful for cutting only logs having a limited range of diameters or lengths. Another object of the invention is to provide a sawbuck with which a large range of log diameters and a large range of lengths may be cut.

Various known types of sawbucks are undesirable because their usage can result in severe chain saw binding while cutting takes place. Another object of the invention is to overcome that limitation.

Another object of the invention is to provide a sawbuck which is lightweight and readily portable, yet capable of suitably supporting very heavy logs. It is highly desirable that the weight of a sawbuck not exceed say fifteen pounds, so that it can easily be carried through woods and brush by a man who is also carrying a chain saw. It also is highly desirable that a sawbuck have small enough dimensions that it will readily fit into the trunk of an ordinary car, without collapsing the sawbuck so that substantial time is required to re-assemble or re-adjust it upon arrival at a desired sawing site.

Another object of the invention is to provide an improved sawbuck which is economical to fabricate.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing(s), in which.

Figure 1:
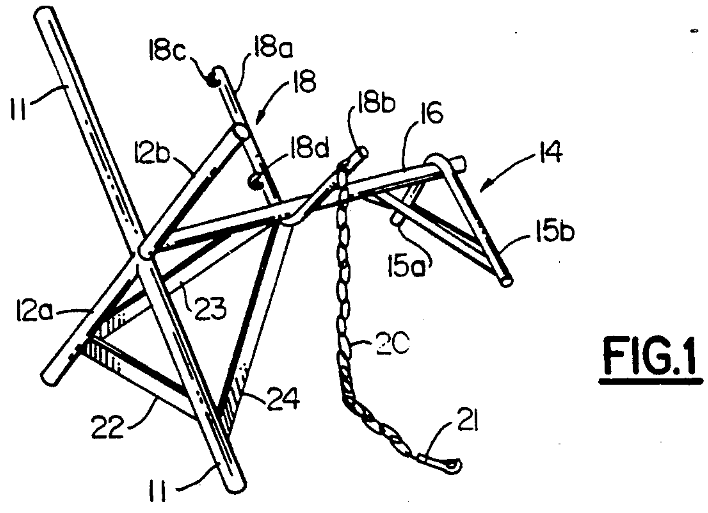
FIG. 1 is an isometric view of a preferred form of the invention.

In FIG. 1 a preferred embodiment of the invention is shown as including a first pair of rigid members 11, 12*a*, 12*b* affixed together in an X-shaped configuration. I prefer that one portion of the first pair comprise a single integral length (e.g., 27 inches) of pipe 11 of 1 inch outside diameter, to which two pieces 12*a*, 12*b* of similar pipe are welded, but it is obvious that equivalent X-shaped member configurations may be formed in a variety of different ways. The broad use of an X-shaped configuration for supporting logs is by no means new, and is shown, for example in U.S. Pat. Nos. 808,940, 4,386,677, 4,703,830, and 4,133,412. Formed in an X-shaped configuration, members 11, 12 present a V-shaped upper notch area within which one end of a log may be supported as shown in FIGS. 2-5. In the mentioned embodiment, members 11, 12*a* and 12*b* sloped upwardly at approximately 51 degrees, with each leg of the "X" having a length of approximately 27 inches. When resting on a level surface, the upper ends of members 11 and 12*b* lay approximately 24 inches above the surface, with about 11 inches between those members at their upper ends, and the end of pipe member 16 welded to member 11 lay approximately 13 inches above the surface. The lower ends of members 11, 12 are spaced substantially apart, approximately 22 inches apart in the mentioned embodiment, providing a lateral stability which tends to prevent a lateral toppling of the device as sawing motions are performed. A transverse bar 22 interconnects member 11 and member 12*a* near their lower ends to strengthen the device.

A rigid rod member 14, bent to an inverted V-shape is spaced apart from the members 11, 12*a*, 12*b* and rigidly interconnected to those members by a longitudinally-extending pipe member 16. In the preferred embodiment, member 16 comprised a length of hollow one-inch 0.D. steel pipe approximately 22 inches long. Member 14 may comprise an integral piece of rod bent to an inverted V shape and having leg portions 15*a*, 15*b*, as shown in the Figures. Significantly, leg portions 15*a*, 15*b* are shorter than members 11, 12, so that the end of bar member 16 supported by members 14, 15 lies at a lower elevation, i.e., closer to the ground, than the end supported by members 11, 12. In the mentioned embodiment, the end of pipe member welded to rod member 14 lay approximately 6 inches above the lower ends of member 14. Thus the lower end of pipe member is situated at roughly half the elevation of the upper end of that member, if the sawbuck is located on a flat and level surface. In use, the device is normally situated atop the ground. In the ensuing description the ground will be assumed to be level, for simplicity of explanation, but the invention actually is very useful even if the ground has a considerable slope in one or two directions.

In the mentioned satisfactory embodiment being described, members 11, 12 comprised one-inch outside-diameter steel gas pipe. Plugs (not shown) are preferably welded in at the lower and upper ends of members 11, 12*a*, 12*b* so that water, mud and the like cannot accumulate inside the pipes and cause rust. The mentioned members are preferably formed of hollow pipe to reduce the weight of the invention, allowing it to be carried to many different locations without unduly tiring the user.

A U-shaped rod member 18 having arm portions 18*a*, 18*b* is shown affixed (e.g., welded) to bar member 16 longitudinally in between member pairs 11, 12 and 14, 15. One end of chain 20 is attached to arm 18*b*. The other end of chain 20 carries a hasp 21 which may be snapped onto any of a plurality of wire loops 18*c*, 18*d* which project from arm 18*a*. Only two such loops are shown, at 18*c* and 18*d*, but it should be apparent that virtually any desired number can be provided on rod member 18. A pair of stiffener bars 23, 24 extend from legs 12*a* and 11 to longitudinal bar member 16, connecting to the latter adjacent U-shaped member 18.

Figure 2:
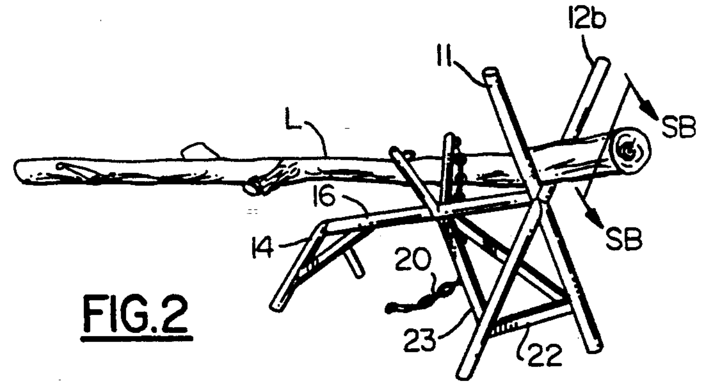
FIGS. 2 and 3 are isometric views of the device of FIG. 1 showing various types of logs or brush supported by the device of FIG. 1, and useful for explaining various advantages and functions of the invention.

For the moment, ignore the presence of member 18 and refer to FIG. 2. It will be seen that a very long log L may be supported in the upper V-shaped notch provided by members 11, 12. Importantly, the log may extend on either side of the U-shaped rod member 18, with one end of the log extending far past members 14, 15 to engage the ground. In order to so support a log, the user, who initially finds a log lying on the ground, need merely lift one end of the log up to an elevation such that he can slide or drop that end into the V-shaped upper notch provided by members 11, 12. Lifting one end of a log requires approximately one half the exertion of lifting the entire weight of the log. Prior art devices which contemplate a supporting of a log near two of its ends thus require about twice as much strength or exertion, or the efforts of two persons. The invention allows one person to handle heavy logs, while two persons would be required with various prior art devices. Inasmuch as the long log need not rest between arms 18*a*, 18*b* of member 18, very crooked logs or branches may be readily accommodated.

With one end of that long log supported in the V-shaped notch, the user can cut successive desired "firewood" lengths from that log, applying the chain saw slightly rightwardly from the position of members 11, 12 as viewed in FIG. 2. To cut successive lengths, the log must be dragged or slid rightwardly. As successive lengths are cut, they are always supported or gripped in cantilever fashion, so that there is no tendency to "bind" the chain saw. The operator can slide, or drag, the log toward the cutting location SB much more easily than lifting the weight of the log.

Assume that a log initially rests as shown in FIG. 2, with its left end lying on the ground. A first cut by the user at plane SB will remove the portion of the log shown rightwardly from plane SB, decreasing the remaining weight of the log. If the user then slides or drags the remaining portion of the log rightwardly, the left end of the log will continue to engage the ground, and the process may be repeated. So long as the center-of-gravity ("CG") of the log lies sufficiently leftwardly from members 11, 12, one end of the log will continue to rest on the ground, or slightly above the ground. When much or most of the log has been cut, the CG may lie very near the longitudinal position of members 11, 12, presenting some danger that chain saw pressure will topple the log clockwise as viewed in FIG. 2. However, at that time, with only a small portion of the original log being left, the operator then may "chain down" the remaining portion, and then cut off one or two more lengths in the same fashion.

Figure 3:
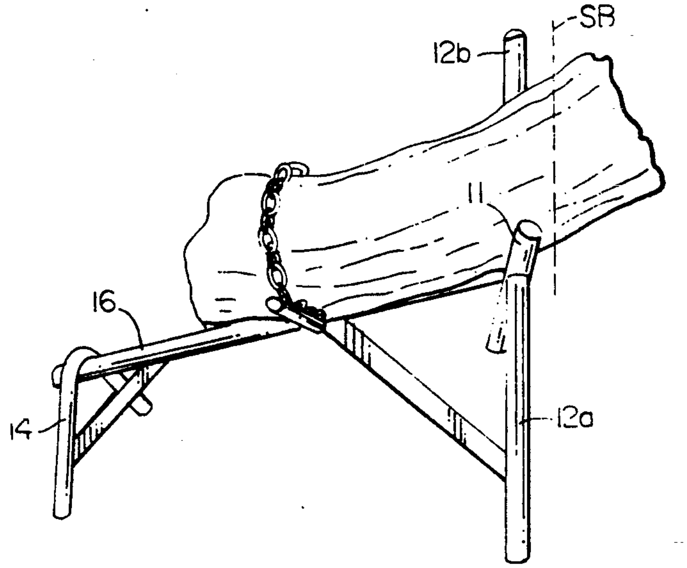

To chain down the remaining portion of a log, the operator must lift its leftward (in the Figures) end to seat in between arms 18*a*, 18*b* of U-shaped rod member 18. While lifting the left (formerly ground-engaging) end well might have been impossibly exertive for an "original" log, which might weigh as much as 1000 lbs., it becomes simple and easy after most of that original log has been cut away. In FIG. 3 the remaining end of a heavy log is shown chained atop the support device, so that a cut may be made at plane SB. With all sawing operations done rightwardly (in the Figures) from the support provided by members 11, 12, i.e., in cantilever fashion, a piece being cut off always bends clockwise (as viewed in the Figures) as it is being cut, and hence no binding of the chain saw occurs.

It often becomes desirable to cut trees or branches having a much smaller diameter than what are usually deemed "logs", and the invention readily accommodates that. Also, one can cut the limbs off a felled tree, and then use the sawbuck of the invention to trim branches off the limbs. The described preferred embodiment weighed only 12 lbs., so that it readily can be carried to successive locations to cut successive piles of wood.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Apparatus for supporting logs and brush during cutting operations, which comprises in combination:

a first pair of rigid members adapted when seated atop a generally-level ground surface, to present a generally V-shaped upper notch area within which one end of a log may be supported at a first elevation;

a second pair of rigid members extending from said ground surface to a second elevation less than said first elevation, and spaced apart from said first pair of rigid members; and an interconnecting bar means rigidly interconnecting said first and second pairs of members.

2. The apparatus of claim 1 which includes a generally U-shaped member having two leg portions affixed to said interconnecting bar means between said first and second pairs of rigid members.

3. The apparatus of claim 1 wherein said rigid members each comprises a hollow metal pipe.

4. The apparatus of claim 1 in which said interconnecting bar means comprises a hollow metal pipe.

5. The apparatus of claim 1 having a transverse bar interconnecting said first pair of rigid members adjacent their lower extremities.

6. The apparatus of claim 1 having a pair of bars connected between said second pair of rigid members and said interconnecting bar means.

7. The apparatus of claim 2 which includes a chain having one of its ends affixed to one leg of said U-shaped member, and wherein the other leg of said U-shaped member carries a plurality of spaced apart attachment means to which the other end of said chain may be removably fastened.

* * * * *